Patented Mar. 23, 1926.

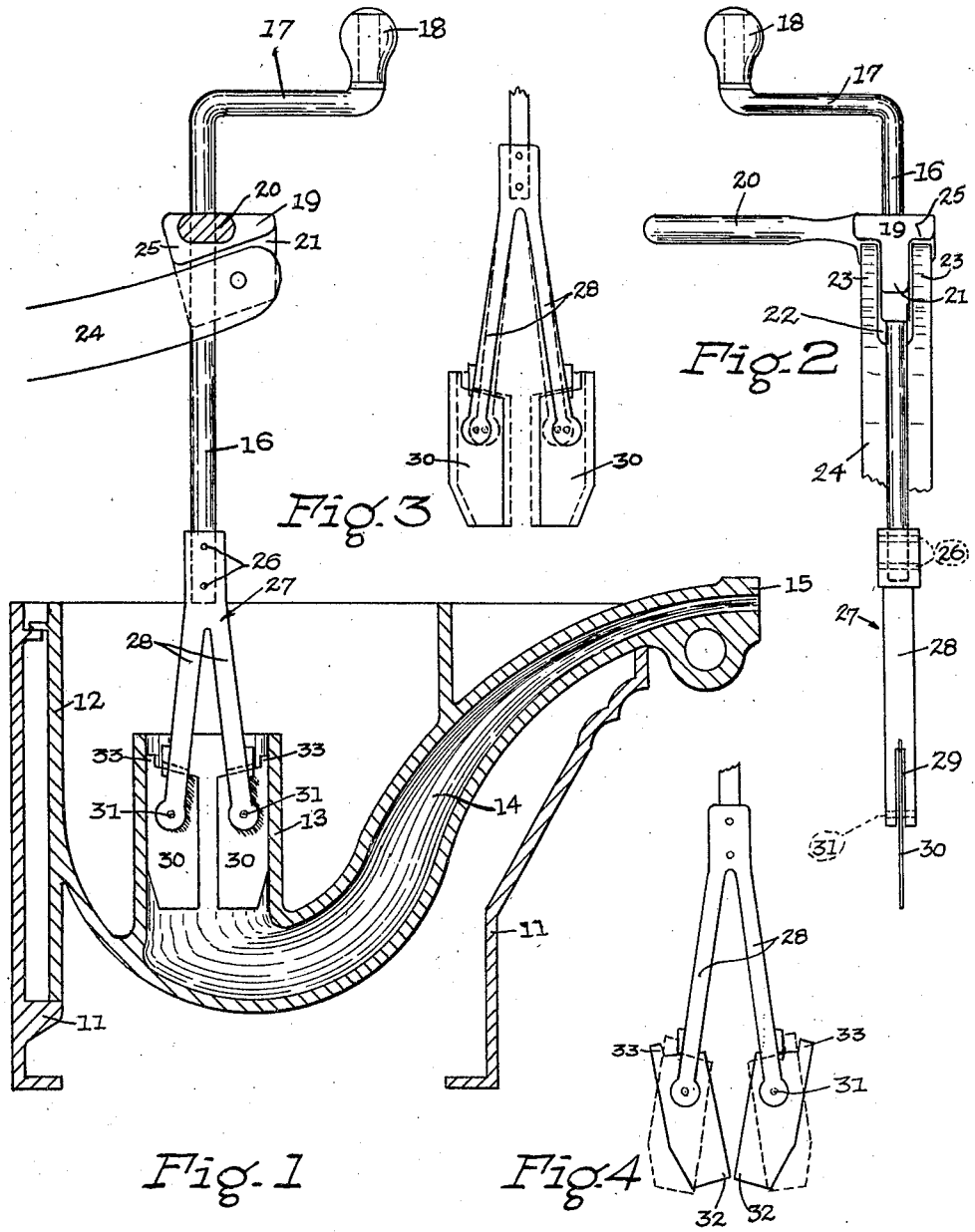

1,577,544

UNITED STATES PATENT OFFICE.

LOUIS A. SENGELE, OF SAN ANTONIO, TEXAS.

SCRAPER.

Application filed October 11, 1923. Serial No. 667,896.

*To all whom it may concern:*

Be it known that I, LOUIS A. SENGELE, a citizen of the United States, residing at San Antonio, in the county of Bexar and State of Texas, have invented a certain new and useful Improvement in Scrapers, of which the following is a full, clear, and exact description, reference being had to the accompanying drawings.

During the operation of machines used for casting type metal there accumulates upon the walls of the pot well, and upon the piston operating therein, an amount of litharge, dross, dirt, and other foreign matter, and accordingly it is necessary in the operation of these machines to periodically remove the piston from the well and clean both the walls of the piston and the walls of the well. My invention provides improved means for cleaning the walls of the well and in the drawings accompanying this specification and forming a part thereof I have shown, for purposes of illustration, one physical embodiment which my invention may assume. In these drawings:

Figure 1 is a front elevation of this illustrative embodiment of my invention shown in position within a well, Figure 2 is a side elevation of the device shown in Figure 1, Figure 3 illustrates the manner in which pressure is exerted upon the scraping knives, while Figure 4 illustrates the action of the knives as they enter the well.

In the drawings I have shown the form of my device herein illustrated as operating in connection with the metal pot of a linotype machine consisting of a jacket 11 enclosing within itself a pot 12 provided with a well 13 communicating by means of a duct 14 with a mouth piece 15 arranged to cooperate with the casting receptacle.

The form of my device herein illustrated comprises a shaft 16 carrying at its upper end a crank arm 17 arranged to rotate the shaft 16 and provided with a handle 18 suitable for that purpose. This shaft 16 is guided and supported within a bearing member or base 19 provided with a handle 20 by which the bearing member and shaft may be held in position and also provided with a tongue or lug 21 arranged to enter the space 22 between the two forks 23 of the pot pump lever 24 and a pair of shoulders 25 arranged to rest upon the upper surface of the forks 23 of the pot pump lever 24, whereby the bearing member 19 may be supported either additionally or entirely upon the pot pump lever 24 after the piston has been disconnected therefrom and removed.

Secured to the lower end of this shaft 16, as by means of rivets 26, is an element 27 comprising a plurality of forks 28 each having in its free end a slot 29 arranged to receive a scraping knife 30 secured to its fork 28 by means of a suitable pivot pin 31, limited in its pivotal movement in one direction by engagement of its tip 32 with the corresponding tip 32 of the opposed scraping knife 30 and in the other direction by engagement of its shoulder 33 with the fork 28, and arranged to be inserted within the well 13 and, upon rotation of the shaft 16, to scrape the walls of the well 13 and remove therefrom the foreign matter accumulated thereon.

In order to increase the action of the scraping knives 30 upon the walls of the well 13 I find it advisable, however, to provide means whereby these knives are pressed tightly against the walls of the well 13 and I have herein shown this means as consisting in forming the element 27 of resilient material such as malleable iron and in placing the forks 28 at such an angle to the axis of the shaft 16 that they project the scraping knives 30 a distance from the axis of the shaft 16 greater than the radius of the well 13 whereby when the knives 30 are inserted within the well 13 the forks 28 must be sprung from their neutral position and will therefore exert upon the knives 30 a pressure effective to hold the knives 30 firmly against the walls of the well 13.

The action of the knives 30 in entering the well 13 is additionally illustrated in Figures 3 and 4. In Figure 3 the solid lines represent the normal or neutral position of the forks 28 and knives 30 while the solid lines in Figure 4 represent the position which the knives take as they are being inserted into the well 13 and the dotted lines in Figure 3 represent the position of the forks 28 and knives 30 after they are in position within the well 13 as shown in Figure 1. The dotted lines in Figure 4 illustrate merely the other extreme pivotal position of the knives 30.

As the knives 30 wear, the distance of the scraping edge thereof from the axis of the shaft 16 may be maintained constant by altering the normal angle of the forks 28 to the shaft 16, this alteration being accomplished by bending the forks 28, and when this wear has become too great for correction in this manner new knives may readily be inserted by merely withdrawing the corresponding pivot pins 31.

It will be understood from the above description that the device herein disclosed is used to clean a well by inserting it into the well with the bearing member 19 in position upon the pot pump lever 24 and then rotating the shaft 16 and knives 30 by means of the handle 18 until the walls of the well are cleaned.

It will be apparent from the above description that I have provided a device peculiarly adapted for cleaning the well of a casting machine. It will, however, be apparent also that the device herein shown is adapted either in whole or in part for other uses and, in addition, those skilled in the art will readily recognize that the particular device herein shown may be variously changed and modified without departing from the spirit of my invention or sacrificing the advantages thereof. It will therefore be understood that the disclosure herein, both as to the exact form of the device and the particular use to which it is put, is illustrative only, and that my invention is not limited thereto.

I claim:

In combination, a base formed to be supported from the pot pump lever of a casting machine and provided with a depending lug arranged to seat within the pot pump piston receiving recess in lieu of said piston, and mechanism supported by said base effective to clean said pot when said base is so supported on said lever.

In testimony whereof, I hereunto affix my signature.

LOUIS A. SENGELE.